United States Patent
Eatough

(10) Patent No.: US 8,341,622 B1
(45) Date of Patent: Dec. 25, 2012

(54) SYSTEMS AND METHODS FOR EFFICIENTLY USING NETWORK BANDWIDTH TO DEPLOY DEPENDENCIES OF A SOFTWARE PACKAGE

(75) Inventor: David A. Eatough, Herriman, UT (US)

(73) Assignee: Crimson Corporation, Dover, DE (US)

( * ) Notice: Subject to any disclaimer, the term of this patent is extended or adjusted under 35 U.S.C. 154(b) by 1265 days.

(21) Appl. No.: 11/304,035

(22) Filed: Dec. 15, 2005

(51) Int. Cl.
*G06F 9/445* (2006.01)
*G06F 9/44* (2006.01)

(52) U.S. Cl. ......................... 717/177; 717/172

(58) Field of Classification Search .......... 717/167–178; 726/25; 709/200–253
See application file for complete search history.

(56) References Cited

U.S. PATENT DOCUMENTS

| | | | | |
|---|---|---|---|---|
| 5,721,824 | A * | 2/1998 | Taylor | 709/203 |
| 6,381,742 | B2 * | 4/2002 | Forbes et al. | 717/176 |
| 6,493,871 | B1 * | 12/2002 | McGuire et al. | 717/173 |
| 6,675,382 | B1 * | 1/2004 | Foster | 717/177 |
| 6,859,923 | B2 * | 2/2005 | Taylor | 717/172 |
| 6,871,345 | B1 * | 3/2005 | Crow et al. | 717/175 |
| 7,000,230 | B1 * | 2/2006 | Murray et al. | 717/172 |
| 7,013,461 | B2 * | 3/2006 | Hellerstein et al. | 717/177 |
| 7,222,341 | B2 * | 5/2007 | Forbes et al. | 717/170 |
| 7,496,910 | B2 * | 2/2009 | Voskuil | 717/168 |
| 7,496,911 | B2 * | 2/2009 | Rowley et al. | 717/174 |
| 7,529,809 | B1 * | 5/2009 | Eatough et al. | 709/218 |
| 7,559,058 | B2 * | 7/2009 | Blumfield et al. | 717/172 |
| 2001/0029605 | A1 * | 10/2001 | Forbes et al. | 717/11 |
| 2002/0129356 | A1 * | 9/2002 | Hellerstein et al. | 717/177 |
| 2002/0144248 | A1 | 10/2002 | Forbes et al. | |
| 2003/0009754 | A1 * | 1/2003 | Rowley et al. | 717/177 |
| 2003/0135749 | A1 * | 7/2003 | Gales et al. | 713/200 |
| 2004/0098706 | A1 * | 5/2004 | Khan et al. | 717/120 |
| 2004/0261060 | A1 | 12/2004 | Haselden et al. | |
| 2005/0120344 | A1 * | 6/2005 | Asare et al. | 717/174 |
| 2006/0271924 | A1 * | 11/2006 | Calcaterra et al. | 717/168 |
| 2007/0005738 | A1 * | 1/2007 | Alexion-Tiernan et al. | 709/223 |

OTHER PUBLICATIONS

LANDesk Software, "Patch Management" [online], 2004 [retrieved Sep. 26, 2012], Retrieved from Internet <http://web.archive.org/web/20051020014512/http://landesk.com/docs/sb/sb_patchmanagment.pdf>, pp. 1-6.*

Dunagan, J., et al., "Towards a Self Manageing Software Patching Process Using Black-Box Persistent-State Manifests," Proceedings of the 2004 International Conference on Autonomic Computing [online], 2004 [retrieved Sep. 26, 2012], Retrieved from Internet: <http://ieeexplore.ieee.org/stamp/stamp.jsp?tp=&arnumber=1301353>, pp. 1-8.*

* cited by examiner

*Primary Examiner* — Isaac Tecklu
*Assistant Examiner* — Todd Aguilera
(74) *Attorney, Agent, or Firm* — Austin Rapp & Hardman

(57) ABSTRACT

A package deployment manager on an administrative system deploys a dependent software package to a plurality of target nodes. The package deployment manager also identifies one or more dependencies of the dependent software package. For each dependency that is identified, the package deployment manager determines which of the plurality of target nodes already have the dependency installed, and deploys the dependency only to the target nodes that do not already have the dependency installed.

15 Claims, 9 Drawing Sheets

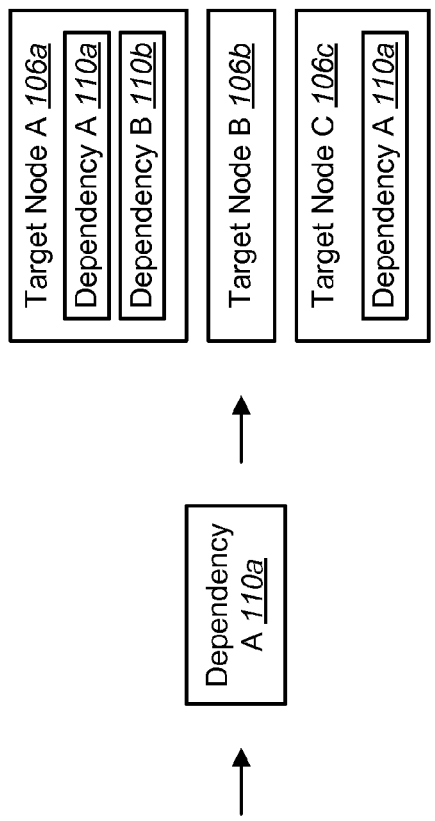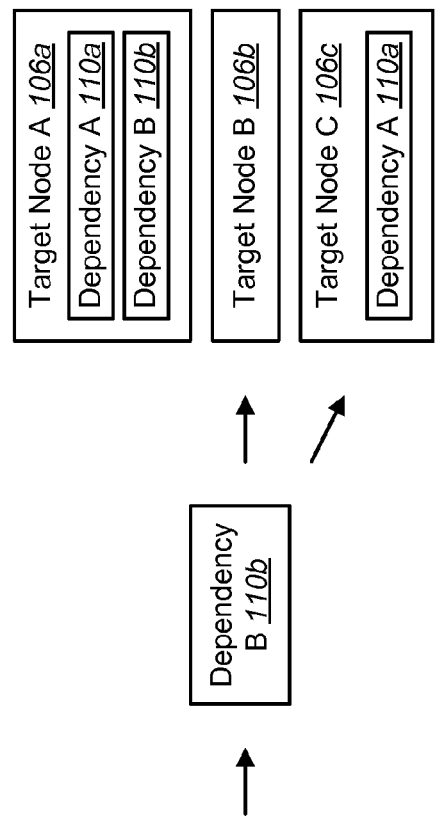

SYSTEMS AND METHODS FOR EFFICIENTLY USING NETWORK BANDWIDTH TO DEPLOY DEPENDENCIES OF A SOFTWARE PACKAGE

TECHNICAL FIELD

The present invention relates generally to computers and computer-related technology. More specifically, the present invention relates to systems and methods for efficiently using network bandwidth to deploy dependencies of a software package.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the benefit of the installation or change in influencing the decision. An important concern regarding down-time is the ability to access wide area networks (WAN). The impact that installations will have on WAN links is a important consideration. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIGS. 2-3 illustrate an exemplary way that the package deployment manager may deploy the dependencies to the target nodes according to an embodiment;

DETAILED DESCRIPTION

Figure 1:
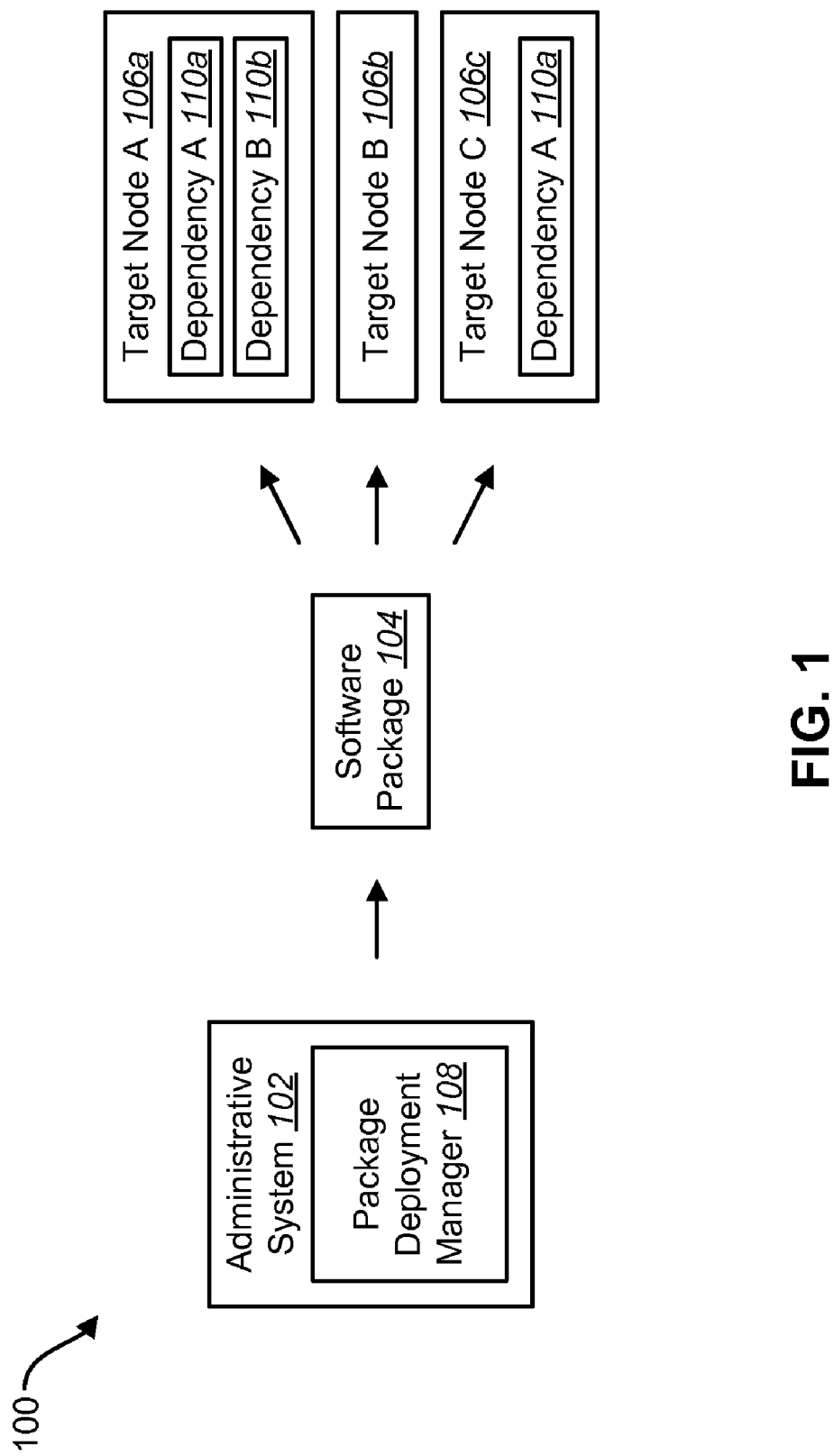
FIG. 1 illustrates a system for efficiently using network bandwidth to deploy dependencies of a software package according to an embodiment, the system including a package deployment manager on an administrative system and a plurality of target nodes.

The responsibilities of a system administrator may include the distribution of software to the computer systems (sometimes referred to as managed nodes, or simply nodes) within the enterprise. Typically, software is distributed as part of a software package. In this context, the term "software package" refers to a set of one or more files that contain logic and binaries for installing a particular piece of software (this kind of package is sometimes referred to as an installation package). An example of a software package is a MICROSOFT INSTALLER (MSI) installation file, which may contain files, groups of files, directories, Component Object Model (COM) components, registry keys, shortcuts, and other data. Another example of a software package is a LANDesk® Enhanced Software Distribution (ESWD) package.

A software package may be dependent on one or more other software packages. For example, a dependent software package may need one or more other software packages to be installed in order to function properly. As used herein, the term "dependent software package" (or simply "dependent package") refers to a software package that is associated in some way with one or more other software packages. The term "dependency" refers to a software package that is associated with a dependent software package. One example of a dependent software package is a service pack for an application suite (such as MICROSOFT OFFICE® application suite). In this example, the application suite itself is a dependency of the service pack.

When a system administrator deploys a software package to the managed nodes within an enterprise, the system administrator may be responsible for ensuring that all of the dependencies for the software package are installed on the managed nodes. Some systems management software products provide system administrators with the option to automatically deploy all dependencies. If such an option is selected, when a dependent software package is deployed all of its dependencies are automatically deployed as well. Automatically deploying dependencies may save system administrators the time and effort associated with manually identifying and deploying all of the dependencies for a particular software package.

It may not be necessary, however, to deploy all of the dependencies each time that a dependent software package is deployed. Some or all of the dependencies may already be installed on at least some of the managed nodes within the enterprise. If this is the case, then the network bandwidth that is devoted to re-deploying these dependencies is wasted. The amount of wasted network bandwidth may be considerable, especially if the dependencies are fairly large in size (e.g., where a dependency is an application suite such as MICROSOFT OFFICE® application suite). Given the importance of efficiently using network resources, benefits may be realized by mechanisms for deploying dependencies that do not require considerable time and effort by system administrators and that do not unnecessarily waste network bandwidth.

Embodiments disclosed herein relate to systems and methods for efficiently using network bandwidth to deploy dependencies of a software package. In accordance with an embodiment, a package deployment manager deploys a dependent software package to a plurality of target nodes. The target nodes may be located in the same network segment, or they may be located in different network segments. The package deployment manager also identifies one or more dependencies of the dependent software package. For each dependency that is identified, the package deployment manager determines which of the target nodes already have the dependency installed, and deploys the dependency only to the target nodes that do not already have the dependency installed.

The dependencies of the dependent software package may be identified in a variety of different ways. For example, the package deployment manager may access dependency information in the dependent software package. Alternatively, the package deployment manager may receive user input that specifies the one or more dependencies.

To determine which of the target nodes already have the dependencies installed, the package deployment manager may send a detection file to the target nodes that identifies the dependencies of the dependent software package. The detection file may also include instructions to search for one or more indicators of the dependencies. Each of the target nodes may include a searching module that processes the detection file and then notifies the package deployment manager about whether the dependencies that are identified in the detection file are installed on the target node.

Once the package deployment manager determines which dependencies are already installed on the target nodes, it may build one or more target lists that indicate where the dependencies are going to be deployed. A variety of communication technologies may be utilized to deploy the dependent software package and the dependencies. For example, the dependent software package and the dependencies may be deployed using multicast technology.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates a system 100 for efficiently using network bandwidth to deploy dependencies according to an embodiment. An administrative system 102 for an enterprise is shown. The administrative system 102 may be used by one or more system administrators to perform tasks related to the management of the enterprise's computer systems, or nodes.

At some point, a system administrator may want to deploy a software package 104 to some or all of the nodes within the enterprise. The nodes that are designated to receive the software package may be referred to herein as target nodes 106. For simplicity, in the illustrated embodiment only three target nodes 106 are shown, namely target node A 106a, target node B 106b, and target node C 106c. Of course, in other embodiments many more target nodes 106 may be provided.

A package deployment manager 108 is provided on the administrative system 102. The package deployment manager 108 is a component (or a set of components) that may be used by the system administrator to deploy the software package 104 to the target nodes 106. The functionality of the package deployment manager 108 may be provided by systems management software that is running on the administrative system 102. Some examples of system management software include the LANDesk® Management Suite, the LANDesk® Server Manager, MICROSOFT SYSTEMS MANAGEMENT SERVER management software, Novell ZENworks®, HP OpenView®, IBM Tivoli Framework®, CA Unicenter®, and so forth.

In typical operation, a system administrator provides input to the package deployment manager 108 in order to initiate the process of deploying the software package 104 to one or more target nodes 106. For example, the system administrator may indicate his/her selection of the software package 104 to be deployed and the target nodes 106 to receive the software package 104. This may be done, for instance, via a user interface of the package deployment manager 108.

In response to the system administrator's input, the package deployment manager 108 may begin the process of deploying the software package 104 to the target nodes 106. As part of this process, the package deployment manager 108 identifies any dependencies 110 of the software package 104. Some exemplary ways that the dependencies 110 may be identified will be described below. In the illustrated embodiment, the package deployment manager 108 identifies two dependencies 110, which are labeled dependency A 110a and dependency B 110b.

As indicated above, at least some of the identified dependencies 110 may already be installed on at least some of the target nodes 106. In the illustrated embodiment, target node A 106a has dependency A 110a and dependency B 110b already installed, while target node C 106c has dependency A 110a already installed.

The package deployment manager 108 determines which of the dependencies 110 are already installed on the target nodes 106. More specifically, for each identified dependency 110, the package deployment manager 108 determines which of the target nodes 106 already have that dependency 110 installed. Some exemplary ways that this determination may be made will be discussed below.

At some point, the package deployment manager 108 deploys the software package 104 to each of the target nodes 106, as shown in FIG. 1. The package deployment manager 108 deploys the dependencies 110 to the target nodes 106 on an "as needed" basis. More specifically, the package deployment manager 108 deploys a particular dependency 110 only to the target nodes 106 that do not already have that dependency 110 installed. This is done for each identified dependency 110. In the illustrated embodiment, the package deployment manager 108 deploys dependency A 110a to target node B 106b, but not to target node A 106a or target node C 106c. This is shown in FIG. 2. The package deployment manager 108 deploys dependency B 110b to target node B 106b and to target node C 106c, but not to target node A 106a. This is shown in FIG. 3.

The software package 104 and its dependencies 110 may be located on the administrative system 102. Alternatively, the software package 104 and/or at least some of its dependencies 110 may be located on one or more other server(s) (not shown). The administrative system 102 may deploy any packages that are located on other server(s) by initiating transmission of these packages from these other server(s) to the appropriate target nodes 106.

It is not necessary that the software package 104 and its dependencies 110 be deployed in a particular order. The software package 104 may be deployed at the same time that its dependencies 110 are deployed. Alternatively, the software package 104 may be deployed prior to its dependencies 110 being deployed (for example, while the package deployment manager 108 is determining which of the dependencies 110 are already installed on the target nodes 106). The software package 104 may even be deployed after its dependencies 110 are deployed.

Various communication technologies may be used to deploy the software package 104 and its dependencies 110. For example, multicast technology may be used. Multicasting refers to the process of sending a message simultaneously to more than one destination (e.g., a target node 106) on a network. Multicasting is different from broadcasting in that multicasting means sending to specific groups within a network, whereas broadcasting implies sending to everybody on the network. With multicast technology, the bulk of the data is typically transmitted once from its source through major backbones of the network and is multiplied, or distributed out, at switching points closer to the destinations.

The package deployment manager 108 may initiate installation of the software package 104 and any deployed dependencies 110 on the target nodes 106. Installation of the software package 104 may be initiated on all of the target nodes 106. In addition, installation of a particular dependency 110 may be initiated on all of the target nodes 106 that have received that dependency 110. More specifically, in the illustrated embodiment the package deployment manager 108 may initiate installation of dependency A 110a on target node B 106b, and may initiate installation of dependency B 110b on target node B 106b and on target node C 106c. Installation of the deployed packages may be initiated simultaneously on all of the target nodes 106, for example after the software package 104 and its dependencies 110 (as appropriate) have been deployed. Alternatively, installation may begin on a particular target node 106 as soon as that target node 106 has received the software package 104 and its dependencies 110.

Figure 5:
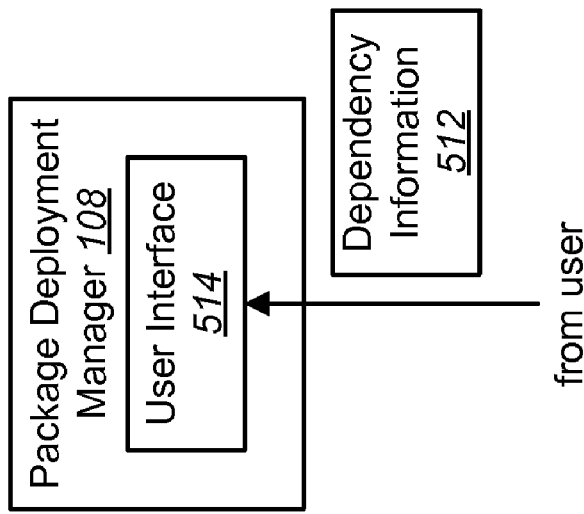
FIG. 5 illustrates an exemplary way that a user of the administrative system may provide dependency information to the package deployment manager.
Figure 4:
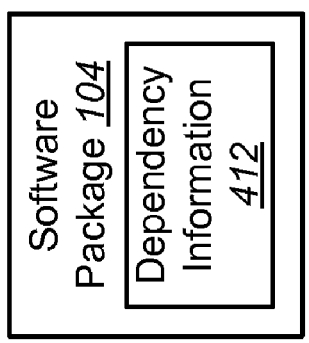
FIG. 4 illustrates a software package that includes dependency information.

As indicated above, as part of the process of deploying the software package 104, the package deployment manager 108 identifies the dependencies 110 of the software package 104. There are a variety of ways that this may be done. Where the software package 104 itself includes information 412 about its dependencies 110, as shown in FIG. 4, the package deployment manager 108 may simply access this dependency information 412. Alternatively, as shown in FIG. 5, the system administrator (or other user) may input information 512 about the dependencies 110 of the software package 104 via a user interface 514 of the package deployment manager 108.

Figure 6:
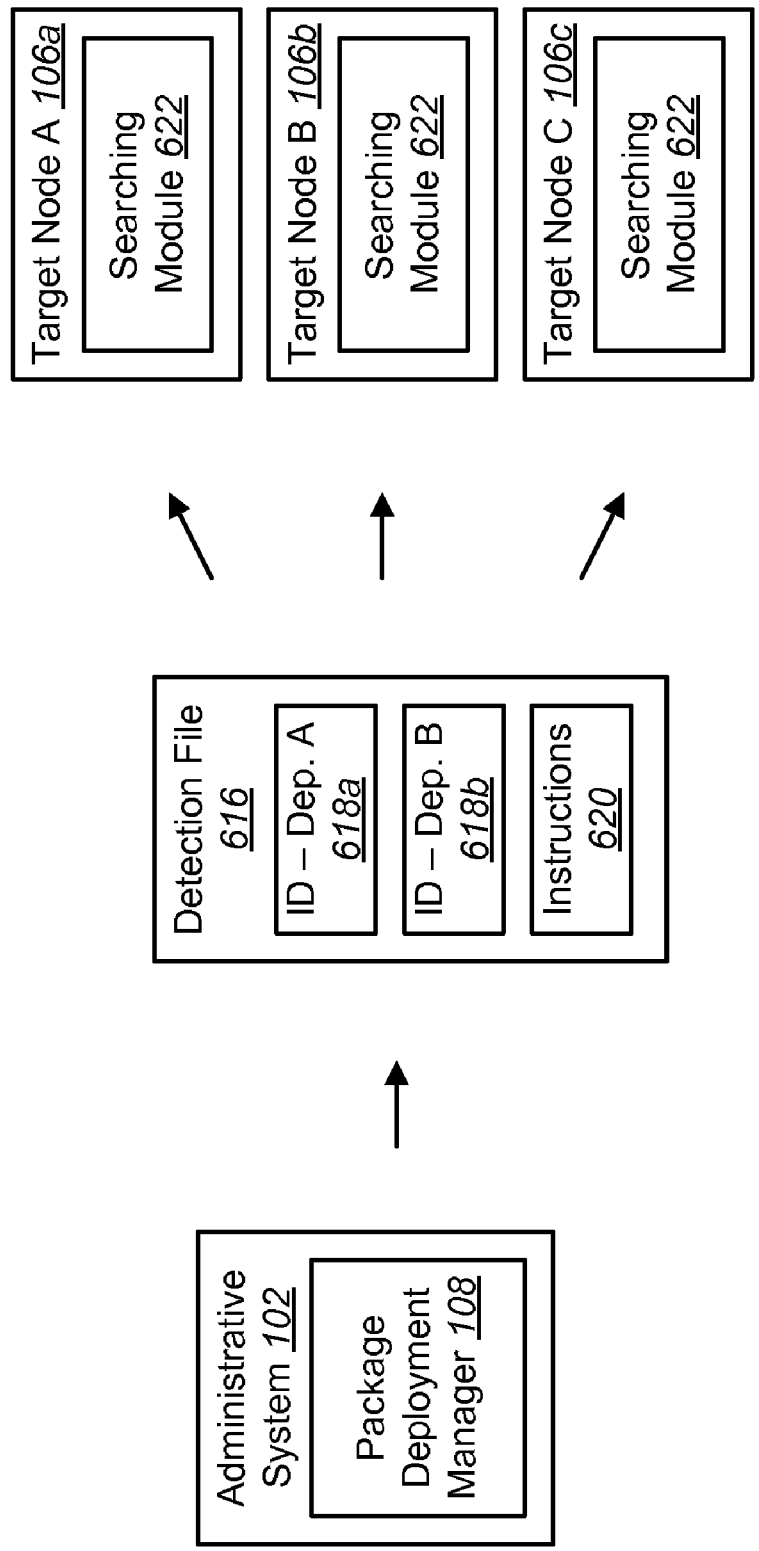
FIG. 6 illustrates an exemplary way that the package deployment manager may determine which dependencies are already installed on the target nodes.

Referring now to FIG. 6, an exemplary way that the package deployment manager 108 may determine which dependencies 110 are already installed on the target nodes 106 will now be discussed. In the illustrated embodiment the package deployment manager 108 sends a detection file 616 to each of the target nodes 106. The detection file 616 identifies the dependencies 110 of the software package 104 to be deployed. For instance, the detection file 616 may include identifiers 618 for the dependencies 110. In the illustrated embodiment, the detection file 616 includes an identifier 618a for dependency A 110a and an identifier 618b for dependency B 110b.

In addition, the detection file 616 includes instructions 620 to search for indicators of the identified dependencies 110 and to notify the package deployment manager 108 about the search results. The instructions 620 may be in a format that is understandable by a searching module 622 that is installed on each of the target nodes 106.

When a particular searching module 622 receives the detection file 616, it processes the detection file 616 and carries out the instructions 620 by searching the target node 106 on which it is installed for indicators of the specified dependencies 110. For example, the searching module 622 may attempt to detect the dependencies 110, look for a particular file or registry key, etc. When it has finished searching, the searching module 622 then notifies the package deployment manager 108 about whether the dependencies 110 that are identified in the detection file 616 are installed on the target node 106. Each searching module 622 may be configured to operate in this manner.

Figure 7:
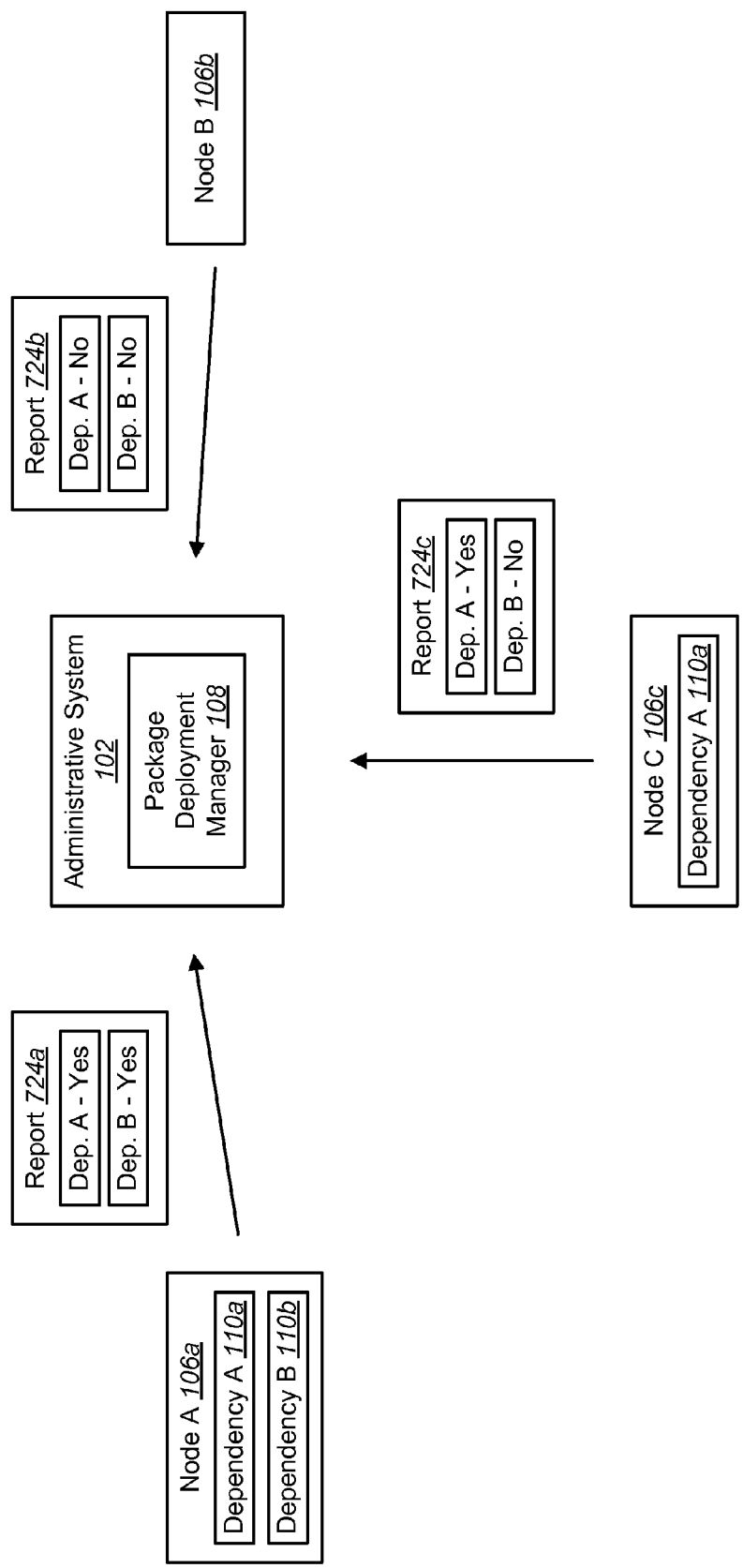
FIG. 7 illustrates an exemplary way that the target nodes may notify the package deployment manager about the dependencies that are installed.

There are many ways that the searching module 622 on a target node 106 may notify the package deployment manager 108 about its search results. For example, as shown in FIG. 7, a report 724 may be sent from each target node 106 to the package deployment manager 108. The report 724 from a particular target node 106 may, for example, list all of the identified dependencies 110 and, for each listed dependency 110, indicate whether it is installed or not installed on the corresponding target node 106. In the illustrated embodiment, the report 724a from target node A 106a indicates that dependency A 110a and dependency B 110b are already installed on target node A 106a. The report 724b from target node B 106b indicates that neither dependency A 110a nor dependency B 110b are installed on target node B 106b. The report 724c from target node C 106c indicates that dependency A 110a is installed on target node C 106c, but that dependency B 110b is not installed. As an alternative to the illustrated embodiment, the report from a particular searching module 622 may list only the dependencies 110 that are installed (or that are not installed) on the corresponding target node 106.

There are many different kinds of searching modules 622 and detection files 616 that may be used. An example of a searching module 622 that may be used is a vulnerability scanner, which is a tool that is provided by the LANDesk® Patch Manager. An example of a detection file 616 that may be used is a LANDesk® Patch Manager vulnerability definition file.

Although sending a detection file 616 to the target nodes 106 is one way to determine what dependencies 110 are installed, embodiments are not limited in this regard. Other mechanisms for determining what dependencies 110 are installed on the target nodes 106 may also be used, such as Visual Basic scripts, executable files, etc.

Once the package deployment manager 108 determines which dependencies 110 are already installed on the target nodes 106, it may build one or more target lists that indicate where the dependencies 110 are going to be deployed. A separate target list may be built for each dependency 110. The target list for a particular dependency 110 may indicate which of the target nodes 106 are going to receive that dependency 110.

Figure 8:
FIG. 8 illustrates exemplary target lists that may be generated for the dependencies.

FIG. 8 illustrates exemplary target lists 826 that may be generated for dependency A 110a and dependency B 110b. The target list 826a for dependency A 110a includes an identifier 828b for target node B 106b. The target list 826b for dependency B 110b includes an identifier 828b for target node B 106b and an identifier 828c for target node C 106c.

Figure 10:
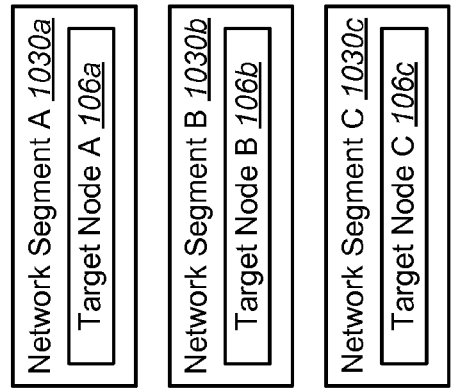
FIG. 10 illustrates the target nodes being located in different network segments.
Figure 9:
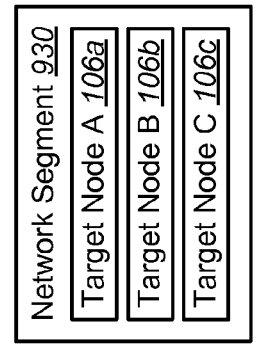
FIG. 9 illustrates the target nodes being located in the same network segment.

As shown in FIG. 9, the target nodes 106 that are selected to receive the software package 104 may be located in the same network segment 930. Alternatively, as shown in FIG. 10, at least some of the target nodes 106 may be located in different network segments 1030. In the embodiment shown in FIG. 10, target node A 106a is located in network segment A 1030a, target node B 106b is located in network segment B 1030b, and target node C 106c is located in network segment C 1030c.

In the context of FIGS. 9-10, a network "segment" may refer to a subnet, a multicast alias domain, a local area network, etc. Additional details about multicast alias domains are disclosed in U.S. Published Patent Application No. 2003/0039215, titled "Method and Apparatus for Dynamically Discovering Multicast Alias Domains," with inventors David A. Eatough and Gregory P. Olsen. The contents of this published patent application are hereby incorporated by reference.

Although embodiments may be practiced in networks where all of the target nodes 106 receive the software package 104 and its dependencies 110 via a local area network (LAN) connection, the techniques disclosed herein may be particularly beneficial in a network that includes a wide area network (WAN) link. Typically, the resources of a WAN link are scarcer than they are with a LAN link. Thus, the benefits of using network resources more efficiently may be more pronounced where the network comprises a WAN link.

Figure 11:
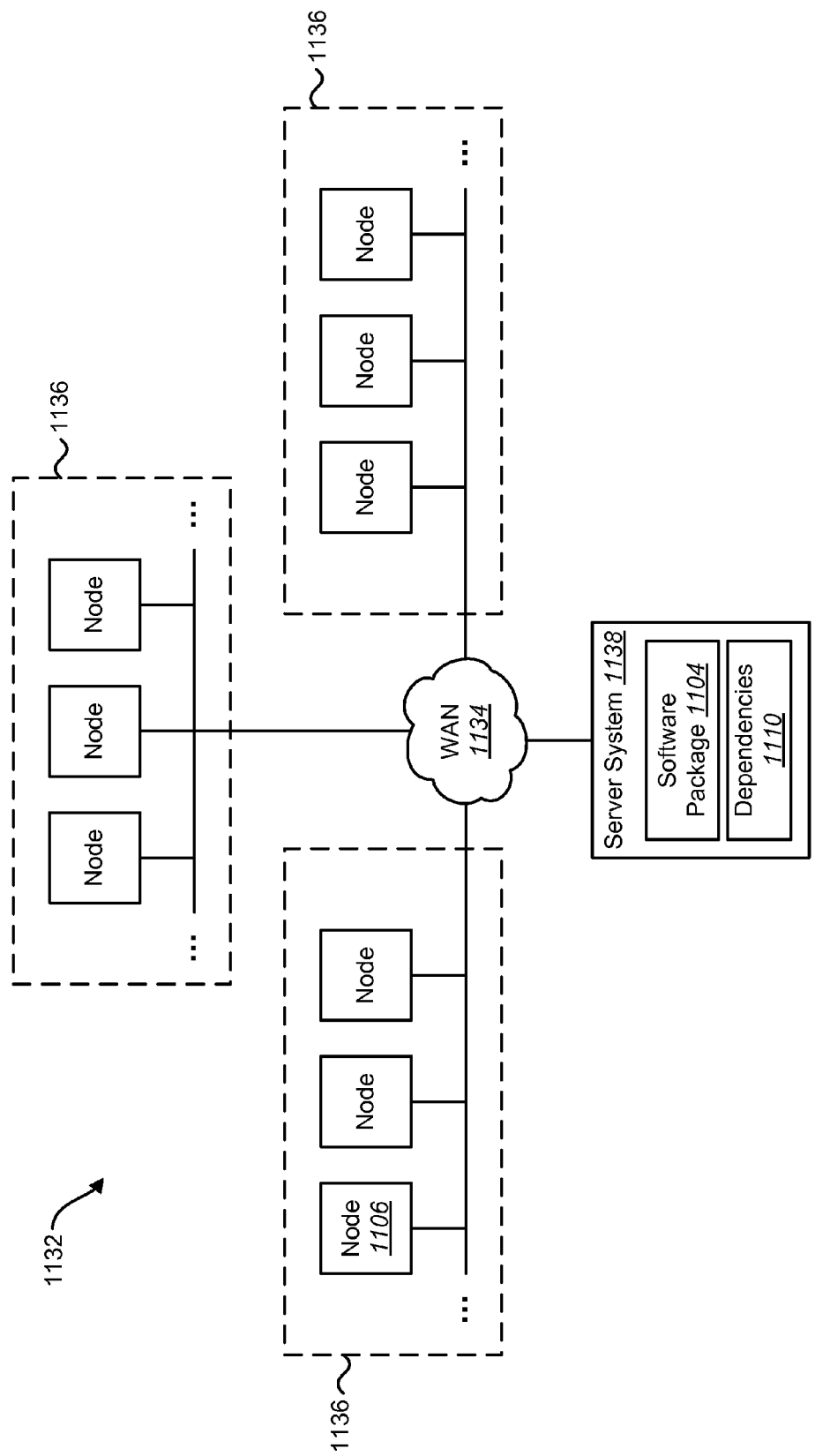
FIG. 11 illustrates an exemplary computer network in which embodiments may be practiced, the computer network including a wide area network (WAN) link.

FIG. 11 illustrates an exemplary computer network 1132 in which embodiments may be practiced. The network 1132 includes a WAN link 1134 and multiple local area networks (LANs) 1136. Each LAN 1136 may include a plurality of target nodes 1106. The WAN link 1134 connects the various LANs 1136 together. A server system 1138 (e.g., the administrative system 102) where the software package 1104 and its dependencies 1110 are stored is connected to the LANs 1136 by means of the WAN link 1134.

Figure 12:
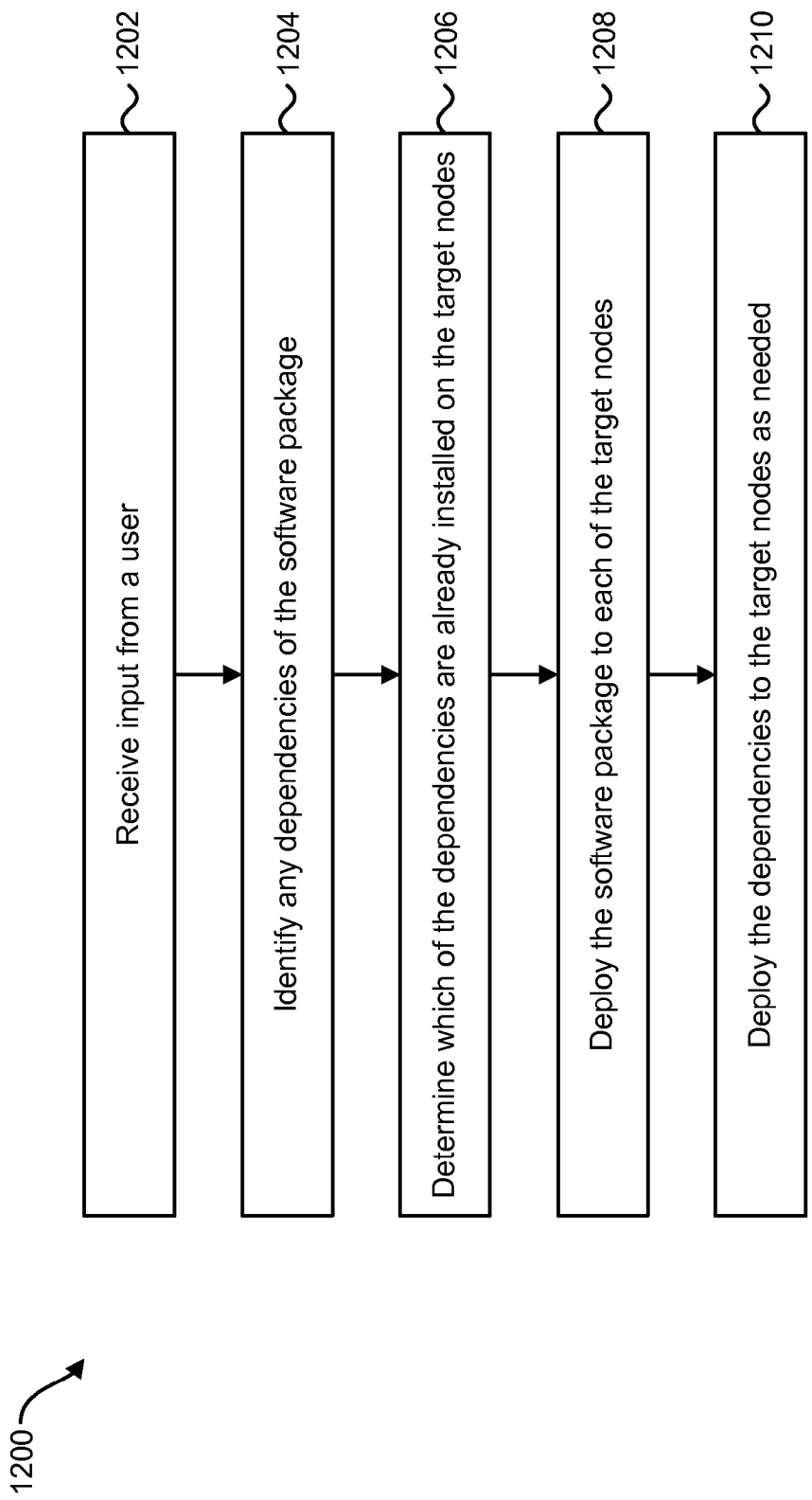
FIG. 12 is a flow diagram which illustrates a method for efficiently using network bandwidth to deploy dependencies according to an embodiment.

FIG. 12 is a flow diagram which illustrates a method 1200 for efficiently using network bandwidth to deploy dependencies according to an embodiment. The method 1200 may be implemented by a package deployment manager 108 on an administrative system 102 for an enterprise.

In step 1202, the package deployment manager 108 receives input from a user (e.g., a system administrator) which initiates the process of deploying a software package 104 to one or more target nodes 106. In response to this user input, the package deployment manager 108 begins the process of deploying the software package 104 to the target nodes 106.

In step 1204 the package deployment manager 108 identifies any dependencies 110 of the software package 104. In step 1206, the package deployment manager 108 determines which of the dependencies 110 are already installed on the target nodes 106. In other words, for each identified dependency 110, the package deployment manager 108 determines which of the target nodes 106 already have that dependency 110 installed. This may involve sending a detection file 616 to the target nodes 106 that includes instructions 620 to search for indicators of the identified dependencies 110 and to notify the package deployment manager 108 about the search results. The instructions 620 may be in a format that is understandable by searching modules 622 that are installed on each of the target nodes 106.

In step 1208, the package deployment manager 108 deploys the software package 104 to each of the target nodes 106. In step 1210, the package deployment manager 108 deploys the dependencies 110 to the target nodes 106 on an "as needed" basis. More specifically, for each dependency 110 that is identified in step 1204, the package deployment manager 108 deploys the dependency 110 only to the target nodes 106 that do not already have the dependency 110 installed.

Although the flow diagram shown in FIG. 12 shows the step of deploying the dependencies 110 after the step of deploying the software package 104, it is not necessary that the software package 104 and its dependencies 110 be deployed in this order. The software package 104 may be deployed at the same time that its dependencies 110 are deployed, or even after its dependencies 110 are deployed.

Figure 13:
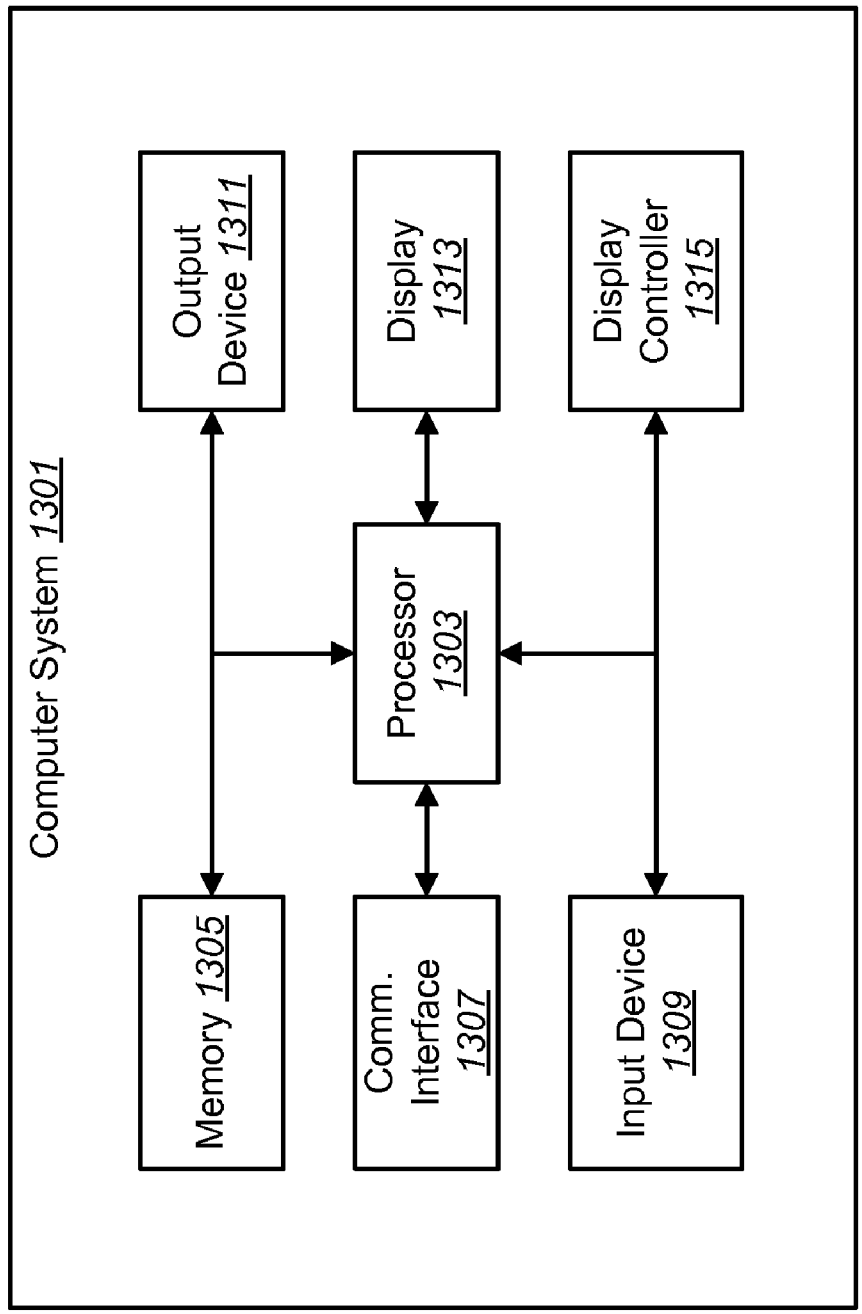
FIG. 13 is a block diagram illustrating the major hardware components typically utilized in a computer system.

FIG. 13 is a block diagram illustrating the major hardware components typically utilized in a computer system 1301. The illustrated components may be located within the same physical structure or in separate housings or structures.

The computer system 1301 includes a processor 1303 and memory 1305. The processor 1303 controls the operation of the computer system 1301 and may be embodied as a microprocessor, a microcontroller, a digital signal processor (DSP) or other device known in the art. The processor 1303 typically performs logical and arithmetic operations based on program instructions stored within the memory 1305.

As used herein, the term memory 1305 is broadly defined as any electronic component capable of storing electronic information, and may be embodied as read only memory (ROM), random access memory (RAM), magnetic disk storage media, optical storage media, flash memory devices in RAM, on-board memory included with the processor 1303, EPROM memory, EEPROM memory, registers, etc. The memory 1305 typically stores program instructions and other types of data. The program instructions may be executed by the processor 1303 to implement some or all of the methods disclosed herein.

The computer system 1301 typically also includes one or more communication interfaces 1307 for communicating with other electronic devices. The communication interfaces 1307 may be based on wired communication technology, wireless communication technology, or both. Examples of different types of communication interfaces 1307 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 1301 typically also includes one or more input devices 1309 and one or more output devices 1311. Examples of different kinds of input devices 1309 include a keyboard, mouse, microphone, remote control device, button, joystick, trackball, touchpad, lightpen, etc. Examples of different kinds of output devices 1311 include a speaker, printer, etc. One specific type of output device which is typically included in a computer system is a display device 1313. Display devices 1313 used with embodiments disclosed herein may utilize any suitable image projection technology, such as a cathode ray tube (CRT), liquid crystal display (LCD), light-emitting diode (LED), gas plasma, electroluminescence, or the like. A display controller 1315 may also be provided, for converting data stored in the memory 1305 into text, graphics, and/or moving images (as appropriate) shown on the display device 1313.

Of course, FIG. 13 illustrates only one possible configuration of a computer system 1301. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art such as a computer-readable medium. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

An exemplary vulnerability definition file that may be used is provided below.

<?xml version="1.0" encoding="utf-8" ?>
<VulnerabilityData xmlns:xsd="http://www.w3.org/2001/XMLSchema"
    xmlns:xsi="http://www.w3.org/2001/XMLSchema-instance"
    xmlns="http://tempuri.org/">
    <lastUpdate>0</lastUpdate>
    <Merge>false</Merge>

```xml
<vulnerabilities>
<Vulnerability Lang="INTL" Vul_ID="Test1">
    <Status>Enabled</Status>
<Patches>
<Patch Reboot="RUnknown" UniqueFilename=" "Hash=" ">
    <Name>Rule 1</Name>
<Advanced>
<DetectScript/>
    </Advanced>
<State>Enabled</State>
<Files>
<File>
<Path>C: \Program Files\LANDesk\LDClient\test1.txt</Path>
<FileDate/>
<FileSize>0</FileSize>
<Checksum/>
<Version/>
<CommandID>c</CommandID>
<Flags/>
    </File>
    </Files>
<RegKeys/>
<Products/>
<Platforms>
<ID>win2k</ID>
<ID>win2k3</ID>
<ID>win9x</ID>
<ID>winnt</ID>
<ID>winxp</ID>
    </Platforms>
<UninstallInfo>
<canBeUninstalled>false</canBeUninstalled>
<requiresOriginalPatch>false</requiresOriginalPatch>
<Files/>
<RegKeys/>
    </UninstallInfo>
    </Patch>
    </Patches>
    </Vulnerability>
<Vulnerability Lang="INTL" Vul_ID="Test2">
<Status>Enabled</Status>
<Patches>
<Patch Reboot="RUnknown" UniqueFilename=" " Hash=" ">
<Name>Rule 1</Name>
<Advanced>
<DetectScript/>
    </Advanced>
<State>Enabled</State>
<Files>
<File>
<Path>C: \Program Files\LANDesk\LDClient\test2.txt</Path>
<FileDate/>
<FileSize>0</FileSize>
<Checksum/>
<Version/>
<CommandID>c</CommandID>
<Flags/>
    </File>
    </Files>
<RegKeys/>
<Products/>
<Platforms>
<ID>win2k</ID>
<ID>win2k3</ID>
<ID>win9x</ID>
<ID>winnt</ID>
<ID>winxp</ID>
    </Platforms>
<UninstallInfo>
<canBeUninstalled>false</canBeUninstalled>
<requiresOriginalPatch>false</requiresOriginalPatch>
<Files/>
<RegKeys/>
    </UninstallInfo>
    </Patch>
    </Patches>
    </Vulnerability>
    </vulnerabilities>
<products/>
    </VulnerabilityData>
```

What is claimed is:

1. A computer-implemented method for efficiently using network bandwidth to deploy dependencies of a software package to a plurality of target nodes, comprising:
    deploying a dependent software package to the plurality of target nodes;
    identifying one or more dependencies of the dependent software package; and
    for each dependency that is identified:
        determining which of the plurality of target nodes already have the dependency installed, wherein determining which of the plurality of target nodes already have the one or more dependencies installed comprises:
            sending a detection file to the plurality of target nodes, wherein the detection file identifies the one or more dependencies of the dependent software package and comprises instructions to search for one or more indicators of the one or more dependencies, wherein the detection file is sent from management software running on a computer system external to the target nodes, wherein the instructions to search comprise instructions to search for a particular registry key; and
            receiving at the management software notification from the plurality of target nodes about whether the one or more dependencies are already installed; and
        deploying the dependency only to the target nodes that do not already have the dependency installed,
        wherein the detection file is a vulnerability definition file that is defined by an XML (Extensible Markup Language) document, wherein the XML document comprises an uninstall information element that indicates whether an uninstallation can be performed and whether an original patch element is required, a patches element and a registration keys element that includes the following as child elements: an uninstall information element, a patch element, and a vulnerability element.

2. The method of claim 1, wherein the dependent software package and the one or more dependencies are deployed using multicast technology.

3. The method of claim 1, wherein identifying the one or more dependencies comprises accessing dependency information in the dependent software package.

4. The method of claim 1, wherein the dependent software package is deployed to the plurality of target nodes when the detection file is sent to the plurality of target nodes.

5. The method of claim 1, wherein the dependent software package is deployed to the plurality of target nodes when the one or more dependencies are being deployed to the plurality of target nodes.

6. The method of claim 1, further comprising building one or more target lists that indicate where the one or more dependencies are going to be deployed.

7. The method of claim 1, wherein the plurality of target nodes are located in a same network segment.

8. The method of claim 1, wherein at least some of the plurality of target nodes are located in different network segments.

9. The method of claim 1, wherein at least one wide area network link exists between a system on which the dependent software package is stored and at least some of the plurality of target nodes.

10. The method of claim 1, wherein the method is implemented by an administrative system.

11. The method of claim 1, further comprising:
  initiating installation of the dependent software package on the plurality of target nodes; and
  for each dependency, initiating installation of the dependency on any of the plurality of target nodes to which the dependency has been deployed.

12. A computer system that is configured for efficiently using network bandwidth to deploy dependencies of a software package to a plurality of target nodes, the computer system comprising:
  a processor;
  memory in electronic communication with the processor;
  instructions stored in the memory, the instructions being executable to:
    deploy a dependent software package to the plurality of target nodes;
    identify one or more dependencies of the dependent software package; and
    for each dependency that is identified:
      determine which of the plurality of target nodes already have the dependency installed, wherein the executable instructions to determine which of the plurality of target nodes already have the one or more dependencies installed comprise instructions executable to:
        send a detection file to the plurality of target nodes, wherein the detection file identifies the one or more dependencies of the dependent software package and comprises instructions to search for one or more indicators of the one or more dependencies, wherein the detection file is sent from management software running on the computer system, the computer system being external to the target nodes, wherein the instructions to search comprise instructions to search for a particular registry key; and
        receive at the management software notification from the plurality of target nodes about whether the one or more dependencies are already installed; and
      deploy the dependency only to the target nodes that do not already have the dependency installed,
      wherein the detection file is a vulnerability definition file that is defined by an XML (Extensible Markup Language) document, wherein the XML document comprises an uninstall information element that indicates whether the dependency can be an uninstallation can be performed and whether an original patch element is required, a patches element and a registration keys element that includes the following as child elements: an uninstall information element, a patch element, and a vulnerability element.

13. The computer system of claim 12, wherein the instructions are executable to deploy the dependent software package and the one or more dependencies using multicast technology.

14. A non-transitory computer-readable medium comprising executable instructions for efficiently using network bandwidth to deploy dependencies of a software package to a plurality of target nodes, the instructions being executable to:
  deploy a dependent software package to the plurality of target nodes;
  identify one or more dependencies of the dependent software package; and
  for each dependency that is identified:
    determine which of the plurality of target nodes already have the dependency installed, wherein the executable instructions to determine which of the plurality of target nodes already have the one or more dependencies installed comprise instructions executable to:
      send a detection file to the plurality of target nodes, wherein the detection file identifies the one or more dependencies of the dependent software package and comprises instructions to search for one or more indicators of the one or more dependencies, wherein the detection file is sent from management software running on a computer system external to the target nodes, wherein the instructions to search comprise instructions to search for a particular registry key; and
      receive notification at the management software from the plurality of target nodes about whether the one or more dependencies are already installed; and
    deploy the dependency only to the target nodes that do not already have the dependency installed,
    wherein the detection file is a vulnerability definition file that is defined by an XML (Extensible Markup Language) document, wherein the XML document comprises an uninstall information element that indicates whether an uninstallation can be performed and whether an original patch element is required, a patches element and a registration keys element that includes the following as child elements: an uninstall information element, a patch element, and a vulnerability element.

15. The non-transitory computer-readable medium of claim 14, wherein the instructions are executable to deploy the dependent software package and the one or more dependencies using multicast technology.

* * * * *

UNITED STATES PATENT AND TRADEMARK OFFICE
CERTIFICATE OF CORRECTION

| | | |
|---|---|---|
| PATENT NO. | : 8,341,622 B1 | Page 1 of 1 |
| APPLICATION NO. | : 11/304035 | |
| DATED | : December 25, 2012 | |
| INVENTOR(S) | : Eatough | |

It is certified that error appears in the above-identified patent and that said Letters Patent is hereby corrected as shown below:

In the Claim

In column 14, line 5, claim 12, please delete "whether the dependency can be an" and replace it with --whether an--.

Signed and Sealed this
Twenty-eighth Day of January, 2014

Michelle K. Lee
*Deputy Director of the United States Patent and Trademark Office*